June 10, 1930.  F. JOHANNSEN  1,762,867
PROCESS FOR WORKING UP COMPLEX ORES AND METALLURGICAL PRODUCTS
Filed Jan. 21, 1927
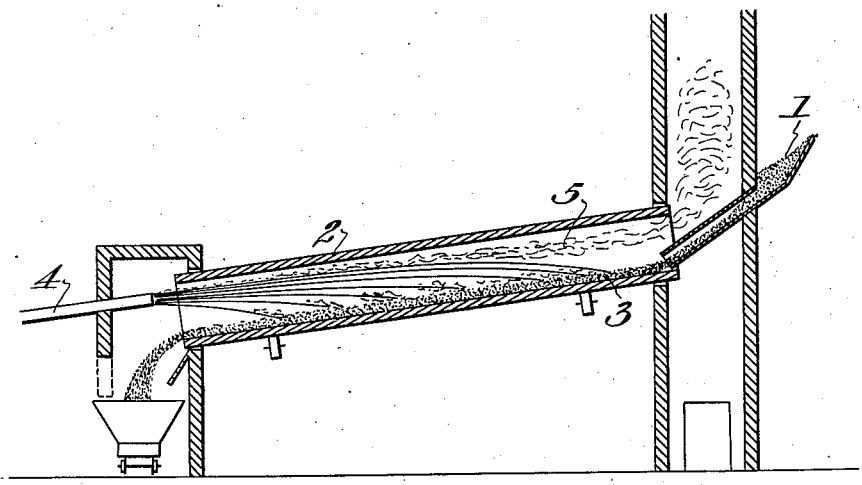
Inventor:
Friedrich Johannsen
By Knight Bro
his Attorneys Patented June 10, 1930

1,762,867

UNITED STATES PATENT OFFICE

FRIEDRICH JOHANNSEN, OF MAGDEBURG, GERMANY, ASSIGNOR TO THE FIRM FRIED. KRUPP GRUSONWERK AKTIENGESELLSCHAFT, OF MAGDEBURG-BUCKAU, GERMANY

PROCESS FOR WORKING UP COMPLEX ORES AND METALLURGICAL PRODUCTS

Application filed January 21, 1927, Serial No. 162,679, and in Germany January 26, 1926.

This invention relates to processes for working up complex ores and metallurgical products.

There exist many ores which in their natural state in addition to some heavy metals, for example, copper, contain as the principal constituent zinc compounds, and especially zinc sulphide, and which, on account of a large content of compounds of Pb, Sn, Cd, As, Sb, Hg, etc., could only be worked up unprofitably by the methods hitherto employed. The methods heretofore proposed for treating such ores by distillation of the sulfide of lead, for example, do not permit of an effective separation of the lead from any zinc which may be present.

In the case of the process for working up such complex ores and metallurgical products forming the subject of the present invention a separation of the various metallic constituents is effected by partial distillation or sublimation of their metallic sulphides the necessary sulphur being added in any desired form in so far as it is not present in the initial material treated. The distillation or sublimation process is carried out in such manner that the sulphides of Hg, Cd, As, Sb, Sn, and Pb are distilled off and are collected separately from the ZnS, FeS, $Cu_2S$, etc. It is therefore possible, by adjusting the duration of the distillation and the temperature, to carry the separation to the desired degree and there is obtained by the process a high concentration of Zn, Cu, etc. in the residue from the distillation, even though for the purpose of effecting a very thorough purification a small portion of the sulphides of the heavy metals is volatized.

According to the kind of material being treated, a suitable temperature is maintained in the furnace; for example, the volatilizing temperatures for arsenic sulfide are 600–700° C., antimony sulfide 800–900° C., lead sulfide 1000–1200° C., tin sulfide 950–1050° C., cadmium 1400–1500° C. If, therefore, an ore is to be worked which contains, for example, lead sulfide in addition to zinc sulfide, then the temperature in the furnace is kept up to about 1200° and there is obtained a lead-containing flue dust which is practically free from zinc, since zinc sulfide can only be volatilized at a substantially higher temperature.

For the further working up of the residue it is, in certain circumstances, advantageous to subject it, without allowing it to cool, to a roasting process or, with the addition of reducing agents, to a volatilization process for the purpose of the production of zinc oxide etc. The metallic compounds that are distilled off are oxidized while in suspension in the gases and precipitated as oxidic compounds in the known manner.

Preferably, the process is carried out in a reverberatory, multi-stage rabbling or rotary kiln furnace, in which the charge is directly heated by combustion gases.

In the accompanying schematic drawing the carrying out of the process is shown in a rotary kiln. By means of the charging arrangement 1 the charge, together with additions of carbonaceous material, stiffening material, or sulfidizing material, is introduced into the furnace. As a result of the continuous rotation of the furnace and its inclination, the mixture 3 progresses from the upper end of the furnace to the lower, while simultaneously the heat necessary for carrying through the process is produced by heating apparatus 4. The hot gases produced from the flame flow in countercurrent to the progress of the material through the furnace, taking up the distillation products coming out of the material, and in their further progress heat up to a reaction temperature the charge going into the furnace.

In order to avoid any considerable roasting in the distillation process, care must be taken in the case of this mode of carrying out the invention that some reducing substance is mixed with the material so that an atmosphere of practically oxygen-free gas is always maintained directly above the layer of material; in the latter case the combustion of the products of distillation will take place in the higher portions of the furnace atmosphere which still contain oxygen. In the case also of this method of carrying out the invention, the roasting of the residue from the distillation can be conducted in a separate furnace; it can, however, also be effected in the same furnace—for example, a revolving furnace—by so adjusting the addition of reducing agents that the material freed from the metallic impurities is sufficiently poor in carbon to be roasted by the gases of the second portion of the rotary drum, which gases are adjusted for oxidation. The gases from the roasting process are in this case charged with the volatilized metallic compounds and must be freed from them in the known way before being worked up into sulphuric acid. If it be desired when using a reverberatory furnace to effect the further working up of the residue (it may be to separate the Zn from the Cu) by a volatilization process, two separate furnaces are employed in order to collect the gases of this volatilization process separately from the distillation gases.

As far as is necessary for the distillation process or for the subsequent further working up of the residue, sand, limestone, etc., may be added to the material treated in the distillation stage for the purpose of raising the melting point of the material.

In an analogous manner, sulphidic metallurgical products, as well as nonsulphidic metallurgical products to which materials containing sulphur have been added can be worked up in accordance with the process hereinbefore described.

Having now particularly described and ascertained the nature of my said invention and in what manner the same is to be performed, I declare that what I claim is:—

1. Process for working up complex ores or metallurgical products containing metallic sulfides, which consists in heating the charge to a temperature sufficient to volatilize the sulfides of metals whose sulfides are readily volatilizable without volatilizing sulfides of metals whose sulfides are more difficultly volatilizable, while maintaining a reducing atmosphere within the charge and in its immediate vicinity and an oxidizing atmosphere above the charge.

2. Process according to claim 1 in which the temperature is regulated so as to volatilize the sulfides of metals of the group including, lead, tin, cadmium, arsenic, antimony and mercury, without volatilizing the sulfides of metals of the group including zinc, copper and iron.

3. Process according to claim 1 in which the maintenance of a reducing atmosphere within the charge is accomplished by the addition to the charge of a quantity of reducing material sufficient to prevent an oxidation of the sulphides before they escape from the charge into the furnace atmosphere and in which the residue is then immediately subjected to a roasting process.

4. A process according to claim 1, in which any deficiency of sulfur in the initial material is supplied by the addition to the charge of sulfur or sulfur-containing material.

5. Process for working up complex ores or metallurgical products containing metallic sulfides, which consists in heating the charge by direct contact with hot combustion gases to a temperature sufficient to volatilize the sulfides of metals whose sulfides are readily volatilizable without volatilizing sulfides of metals whose sulfides are more difficultly volatilizable, while maintaining a reducing atmosphere within the charge and in its immediate vicinity and an oxidizing atmosphere above the charge.

The foregoing specification signed at Berlin, Germany, this 3rd day of January, 1927.

Dr. Ing. FRIEDRICH JOHANNSEN.